United States Patent [19]
Hinds, Jr.

[11] 3,887,718
[45] June 3, 1975

[54] METHOD AND APPARATUS FOR PROCESSING COTTAGE CHEESE CURD AND LIKE FOODS

[75] Inventor: Horace Hinds, Jr., Mountain View, Calif.

[73] Assignee: Grace Machinery Company Incorporated, Santa Rosa, Calif.

[22] Filed: Aug. 19, 1972

[21] Appl. No.: 173,022

[52] U.S. Cl. ............... 426/491; 426/478; 426/495; 426/506; 99/458
[51] Int. Cl. ............................................ A23c 21/00
[58] Field of Search ................ 31/46, 47, 48, 89, 3; 99/115, 116, 243; 210/514

[56] References Cited
UNITED STATES PATENTS

| | | | |
|---|---|---|---|
| 2,799,398 | 7/1957 | Heymann | 210/388 |
| 2,980,538 | 4/1961 | Wolf | 426/506 |
| 3,071,860 | 1/1963 | Sjoholm et al. | 99/455 |
| 3,292,259 | 12/1966 | Lambert et al. | 99/459 |
| 3,368,278 | 2/1968 | Opie | 99/458 |
| 3,451,555 | 6/1969 | Ginaven | 209/273 |
| 3,523,367 | 8/1970 | Czulak | 426/491 |

Primary Examiner—Louis G. Mancene
Assistant Examiner—Peter K. Skiff
Attorney, Agent, or Firm—Flehr, Hohbach, Test, Albritton & Herbert

[57] ABSTRACT

Method and apparatus for rapidly conveying, draining and separating cottage cheese curd and like delicate food particles from liquids, with minimum alteration of the physical form of the curd and maximum retention of fines in the resultant product. A feed of intermixed liquid and soft particulate food such as cottage cheese curd is caused to move down the surface of an inclined separation screen formed of generally coplanar, spaced apart transverse conveyance surfaces. The conveyance surfaces are arranged at a shallow obtuse angle (5° to 20°) with respect to the direction of conveyance over the screen so as to arrest the movement of solid particles and fines while permitting rapid draining and removal of liquid between the surfaces. The downward slope of the screen (about 30° to 50° from the horizontal) is sufficient to cause the solids to move from one adjacent surface to the next, while the shallow reverse angle of the conveyance surfaces induces a gentle rolling or cascading of the solids down the screen which assists in the removal of liquid. A particular screen embodiment is formed of a plurality of rods having flat polished, tilted conveyance surfaces of a transverse dimension slightly greater than the spacing between adjacent rods. Delicate curds and like foods pass down the surface of the screen with minimum abrasive impacts to cause separation of the food particles (curds and fines) from the entrainment liquid (e.g., whey, water, etc.) in a rapid efficient manner.

20 Claims, 7 Drawing Figures

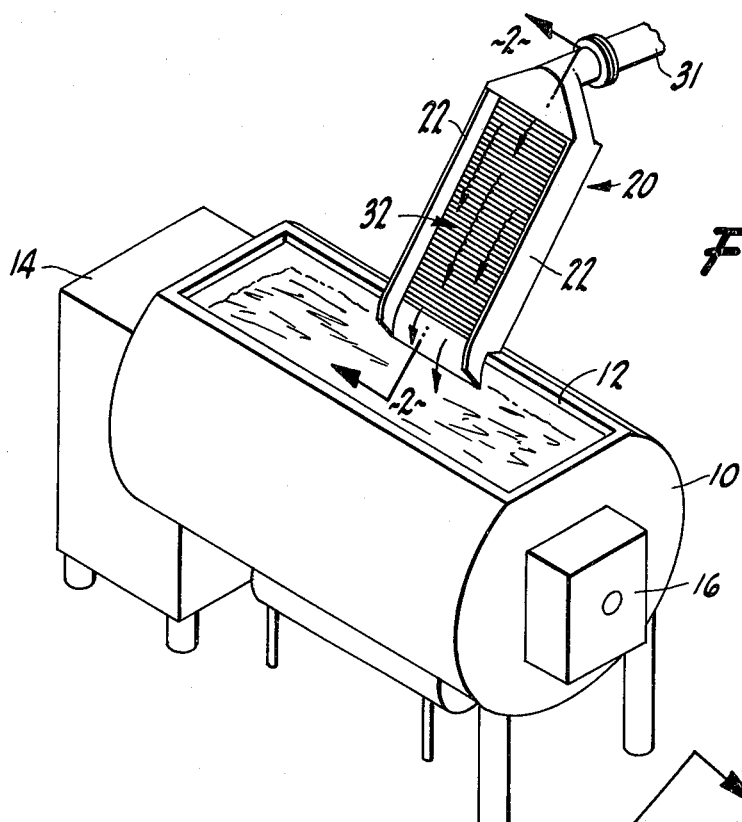
FIG_1
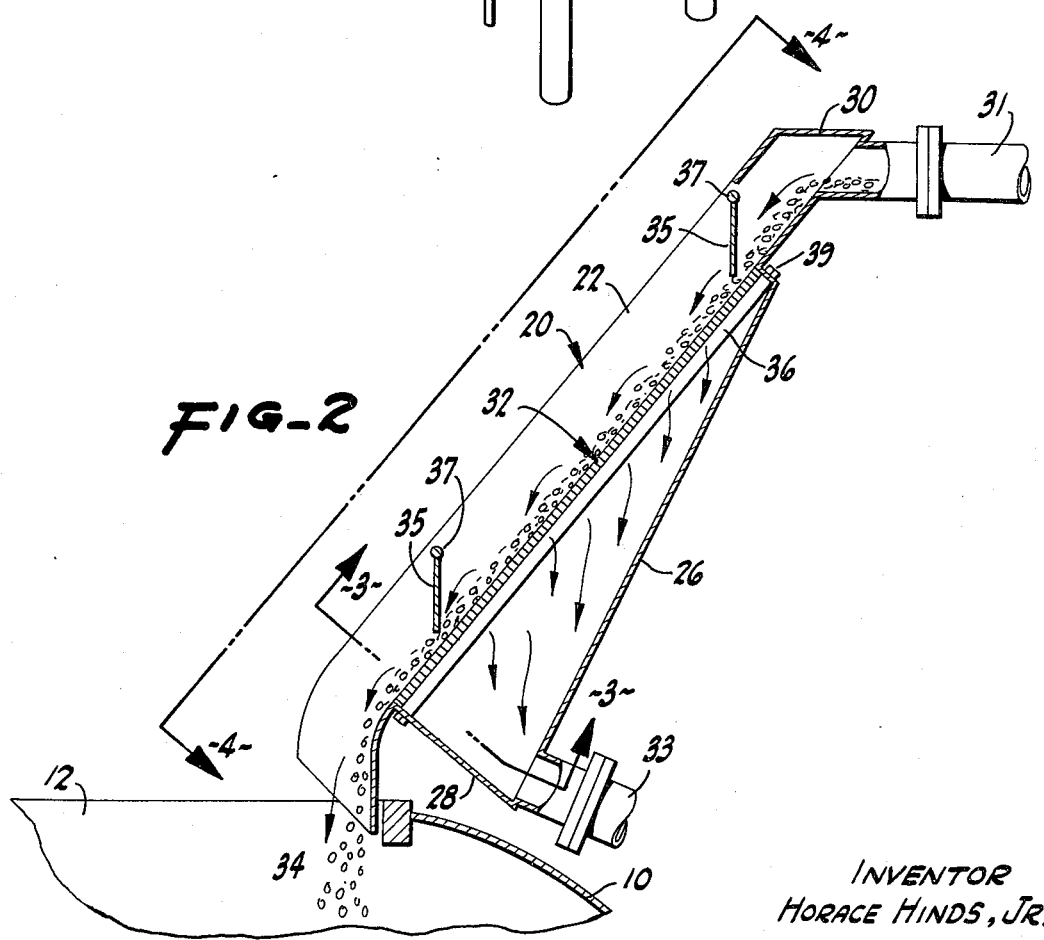
FIG_2
INVENTOR
HORACE HINDS, JR.
BY Flehr, Hohbach, Vest
Albritton & Herbert
ATTORNEYS

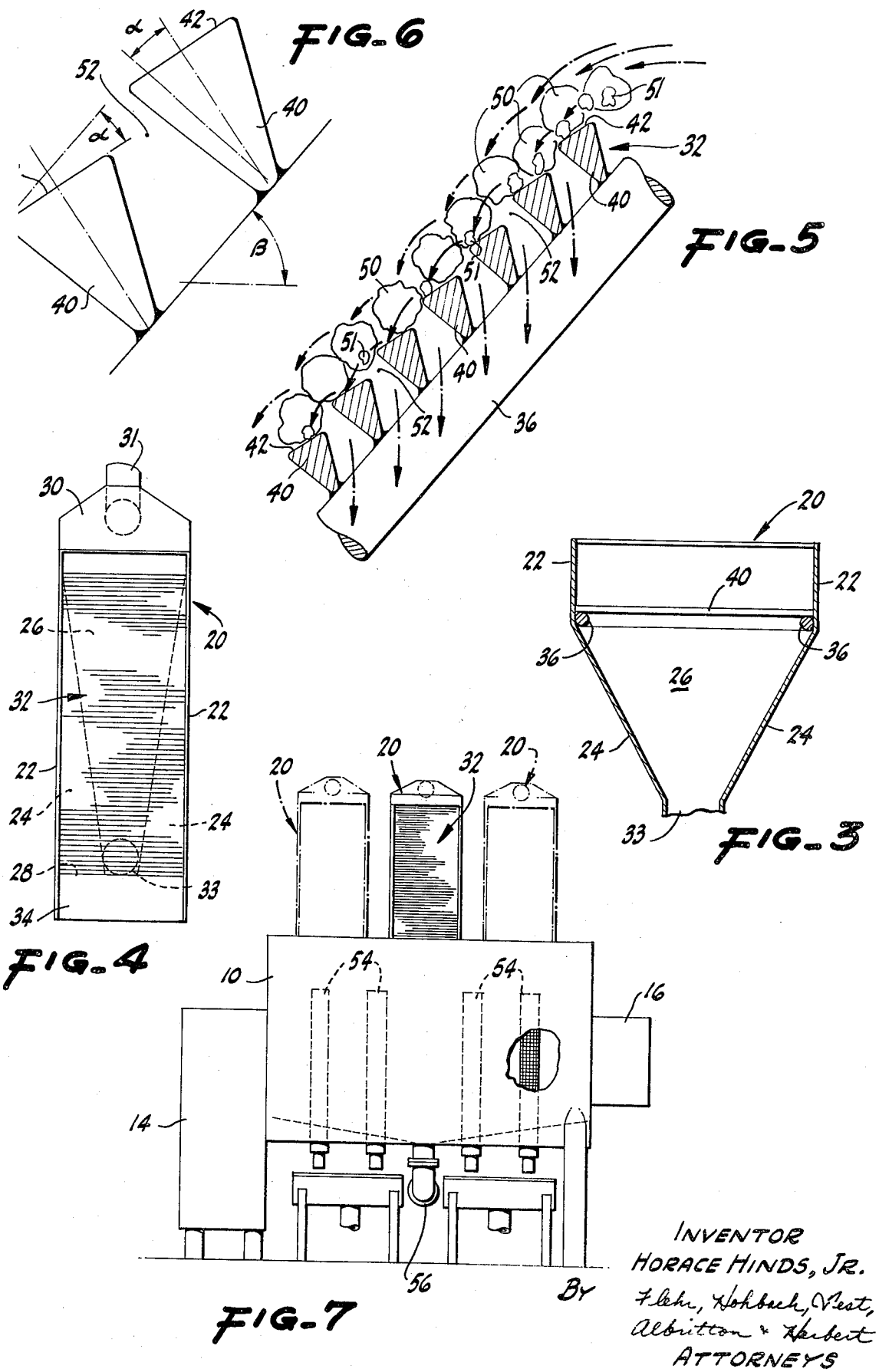

METHOD AND APPARATUS FOR PROCESSING COTTAGE CHEESE CURD AND LIKE FOODS

BACKGROUND OF THE INVENTION

Soft unripened cheeses such as cottage cheese are made by curdling milk in the presence of a natural food acid (viz., lactic acid) and a coagulating enzyme (viz., rennet) or other special coagulating agent. The usual commercial practice is to pasteurize the milk, add lactic acid culture and a small amount rennet, and thereafter to allow a period for setting or coagulation of the curd (usually about 3–16 hours). When the milk has satisfactorily coagulated and "ripened" to a satisfactory whey acidity, the curd is cut and cooked and the whey drained. Thereafter the curd may be washed to remove some of the retained whey and also to lower the temperature so that it is in better condition for holding prior to packaging and marketing. Commonly, cream and salt are added to the curd and the product sold as creamed cottage cheese, although the product has many forms.

Heretofore, draining and/or washing of soft curd products such as cottage cheese has been accomplished by means of perforated plates or, in some cases, rotating drums or screens. In the case of large masses of relatively soft curd, such as cottage cheese curd, drainage of water or whey through the mass tends to achieve a compaction or "self-packing" which greatly inhibits the draining operation. More specifically, the relatively large soft curds tend to deform and fill the drainage channels and to collapse into the void spaces to thereby form a relatively solid mass of curds. In fact, cheddar cheese is intentionally made by so deforming curd particles that all voids are collapsed and a solid mass of curds results. Such a collapse of the curds into the voids and drainage channels is undesirable in cottage cheese manufacture, and customarily requires raking or "ditching" of the curd to obtain a necessary degree of liquid removal in a reasonable period of time.

Operations involving compaction and raking or "ditching" of the curd provide an undesirable effect, in that the particles are reduced or altered in size and additional amounts of "fines" are created. Conventional washing and draining operations associated with such procedures are also unsatisfactory in that large proportions of product in the form of smaller particles or fines are undesirably removed from the system, and either lost or recovered only by difficult and relatively expensive recovery procedures. Also, the operations to tumble or "ditch" the curd to obtain improved drainage causes the curd particles to be altered in size so that the resultant product lacks uniformity of particle size as well as moisture content. It will be appreciated, for example, that large masses of curd will have varying degrees of porosity relative to drainage, tending to make some areas drain less quickly than others, rendering uniformity of product characteristics difficult if not impossible to obtain. These problems are compounded by the tendency of the larger curds to clog the strainer openings whereas the finer particles undesirably pass through the openings. The problem of compression or compacting of the curd in the straining device also renders the subsequent operations to cream and salt the curd difficult to accomplish, particularly in terms of producing products which have uniform characteristics.

From the foregoing, it will be apparent that a new and improved method and apparatus for draining and separating cottage cheese curd and other soft particulate foods from entrained liquids, such as whey or wash water, to provide products of consistently uniform characteristics, is highly to be desired.

SUMMARY OF OBJECTS AND THE INVENTION

The present invention relates generally to an improved method and apparatus for rapidly and efficiently separating intermixed liquids and soft relatively delicate, particulate food materials, and more particularly relates to an improved method and apparatus for the effective separation, draining and washing of cottage cheese curds with minimum alteration of product characteristics or loss of fines from the cottage cheese product.

In accordance with the present invention, a feed of intermixed liquid and relatively soft particulate solids is fed to an inclined separation zone formed as a plurality of spaced apart conveyance surfaces. Conveniently, these conveyance surfaces are formed as upper surfaces of a plurality of transversely extending rods in a rod screen. By tilting the separate conveyance surfaces of these rods in a direction towards the material being received, it is possible to cause the solids to gently cascade down the screen from one conveyance surface to the next with a minimum of abrasive impact to produce or cause loss of fines through the screen. That is, the slight uptilt of the individual conveyance surfaces causes the solid particulate materials to be gently transferred to the next conveyance surface, while the liquid simultaneously passes through the spaces between the rods so as to be rapidly separated from the solid material.

In the processing of soft particulate foods such as cottage cheese, the described concept of the tilt rod screen provides many advantages: a very rapid almost instantaneous separation of the liquid is achieved, in a more uniform fashion than has previously been possible; each particle of curd or food material is handled individually with avoidance of compaction and water occlusion which prevents easy separation; fines are substantially retained with the solid materials and are not lost with the separated liquid; a very efficient moving separation of the solids from the liquids is accomplished in a "static" screen, through a relatively simple, sure operation. Of particular importance is the fact that solid particulate food products obtained from the processing are virtually unchanged in character, and ready for direct processing as may be subsequently required. Thus, in the case of cottage cheese manufacture, curds ranging from relatively large sizes down to very small curds and fines are rapidly separated from the whey or from wash water, as the case may be and are in condition for immediate processing to cream or salt the curd without further preparation.

It is a general object of the present invention, therefore, to provide a new and improved method and means for rapidly and efficiently separating intermixed liquids and soft particulate foods, with minimum alteration of the characteristics of the solid materials and maximum retention of "fines" with the separated solid product.

Another object of the invention is to provide an improved method and means of the character described which provides a more efficient and rapid separation of soft delicate food materials in particulate form, from liquids, than has heretofore been possible.

Another object of the invention is to provide a method and apparatus of the above character which permits the effective handling of relatively large, soft curd materials, such as cottage cheese curds, in a greatly reduced period of time.

Another object of the invention is to provide a static system of apparatus for effectively carrying out rapid efficient separations of soft particulate foods such as cottage cheese, from liquids such as wash water or whey.

Still another object of the invention is to provide an improved method and apparatus of the character described which makes possible the rapid and effective draining and washing of cottage cheese curds to provide a finished product of excellent quality, with little free water content, so that the product can be immediately processed for packaging and sale.

Another object of the invention is to make available an improved method and apparatus for separating cottage cheese curd from whey or wash liquids, which can be easily and inexpensively incorporated into existing processing lines and effectively operated therein by unskilled labor.

Additional objects and advantages of the present invention will appear from the following description in which the preferred embodiments are set forth in detail in conjunction with the accompanying drawing.

BRIEF DESCRIPTION OF THE DRAWING

FIG. 1 is a view in perspective illustrating one embodiment of apparatus incorporating the present invention;

FIG. 2 is an enlarged sectional view along the line 2—2 of FIG. 1;

FIG. 3 is a like view along the line 3—3 of FIG. 2;

FIG. 4 is a plan view, in reduced scale, along the line 4—4 of FIG. 2;

FIG. 5 is an enlarged detail view, similar to FIG. 2, illustrating the construction of the separation screen;

FIG. 6 is a like view of a greatly enlarged scale, illustrating details of rod segments of the separation screen;

FIG. 7 is a view in side elevation of a further embodiment of apparatus incorporating the present invention.

Description of the Preferred Embodiments

The present invention can best be understood after a description of the apparatus illustrated in the drawing. As shown in the embodiment illustrated in FIG. 1, a tank 10 is provided which is dimensioned in accordance with capacity requirements. Assuming the use of the vat 10 in the processing of cottage cheese, it may be provided with a top opening 12 to receive processed materials and, if desired, may be provided with conventional agitating means (not shown) for purposes of blending the cottage cheese with cream, salt or other ingredients, in processing for final packaging. Thus, power means 14 for the agitator and a bearing support or journal 16 may be provided in conventional fashion.

Screening means embodying the present invention, represented at 20, is mounted in self-supporting fashion between a source of supply and the vat opening 12, to deliver drained and/or washed cottage cheese curd to the vat. As illustrated in FIGS. 1 through 4, the means 20 comprises a frame or housing having side walls 22 and convergent bottom walls 24, 26 and 28 which form a collection means for liquid (e.g., whey, wash water, etc.) separated from solid materials being processed. The housing also includes an inlet section 30 to receive and direct the intermixed feed of liquid and solid materials to the separating screen, represented at 32, along a conveyance path generally parallel to the plane of the separation screen. The housing may additionally be provided with a curved discharge flange or plate 34, to convey the separated cottage cheese curd or like soft particulate food material into the vat 10. The screening means 20 is further connected to inlet means 31 for the liquid-solid feed, whereas the bottom or trough portion of the housing is similarly connected to outlet means 33 to facilitate removal of the separated liquid.

As best illustrated in FIGS. 2 and 3, inclined screen supports 36 are received within the bottom walls of the housing, and generally define the plane of operation for the separating screen 32. The supports 36 can be conveniently formed as metal rods removably secured within the housing by means of machine screws or other suitable attachment means 39. As illustrated in the detail view of FIG. 5, the supports 36 are aligned in parallel fashion to provide a convenient means for mounting a plurality of spaced apart transversely extending rods or bars 40. As further illustrated in the detail view of FIG. 6, the bars 40 are of generally triangular configuration, and are provided with smooth substantially planar upper conveyance surfaces 42. It is a feature of the present invention that the transverse rods 40 are tilted so that the conveyance surfaces 42 are at a slight angle with respect to the supports 36 (generally represented by the angle $\alpha$). More specifically, the planar conveyance surfaces 42 are tilted toward the receiving end of the screen at an obtuse, relatively shallow angle as respects the plane of the screen, preferably of the order of about 5° to 20° (optimum 15°). The purpose of this slight reverse inclination is to insure a gentle, arrested cascading motion of the curd particles down the screen with minimum abrasive impacts. This desired motion is accomplished through cooperation of the slight upward tilt of the conveyance surfaces with a substantial downward tilt or slope of the plane of the screen, represented by the angle $\beta$ (see FIG. 6). As hereinafter explained, the angle or slope of the screen with respect to the horizontal is preferably of the order of 30° to 50° (optimum of about 40°), such angle assuring a relatively rapid downward movement of the curd particles simultaneously with a rapid efficient removal of the wash water, whey or other entrainment liquid.

The individual transverse rod members 40 may be secured to the supports 36 by means of resistance welding, or like attachment, to securely hold the rod members in place. In addition, since the screen members are intended for use in the processing of foods, the entire screen unit 32 may be coated with a resistant coating, for example, a surface coating of thermoplastic resin such as vinyl, polyethylene or styrene resin (e.g., vinyl chloride or copolymerized vinyl acetate-chloride). Such coatings provide a tough, odorless, tasteless non-toxic coating for use in sanitary food processes, without detracting from the mechanical features of the tilt rod screen.

The utility of the described apparatus is best described by reference to a particular process for separating intermixed liquids and soft particulate solid materials. For example, in processing to produce cottage cheese an inlet stream of intermixed curds and whey (or curds and wash water) is introduced to the system through the inlet conduit 31, passes through the housing 30, and moves by gravity flow down the surface of the screen 32. As the curd particles (represented at 50 in FIG. 5) come into contact with the conveyance surfaces 42 of the tilt rod screen, they are gently rolled and cascaded down the slope of the screen, passing smoothly from one surface 42 to the next with a minimum tendency towards alteration of the character of the curds through abrasion compaction. Simultaneously, the bulk of the entrainment liquid rapidly passes through the spaces 52 between the rod segments (see FIGS. 5 and 6), to accomplish effective dewatering or separation of the liquid from the curd in a very short period of time. As the curd continues its gently cascading path down the tilt rod screen 32, small amounts of free liquid remaining on the surface of the curd are free to pass through the void spaces 52 and to the liquid discharge outlet 38. When the tumbling curd eventually reaches the discharge lip 34, it is virtually free of entrained liquid, in undamaged form, and in ideal condition for further processing to cream, salt or flavor the curd. During the travel down the screen, the rate of movement or velocity of the solid materials can be further controlled by the use of movable retention means or gates 35 which may be pivotally mounted support means 37 carried by the frame. The gates 35, which may be rigid or flexible tend to retard the movement of solids and liquids and to spread the same evenly across the width of the screen 32.

The particular tilt or slope of the screen 32 for effective dewatering will depend to some extent on the size of the curd being processed. Thus, relatively small hard curds will flow down the screen at a more rapid rate than larger soft curds, and may be effectively processed on screens having a slope as shallow as 30° to 35°. In contrast, large soft curds may be effectively processed on screens having slopes of the order of 40° to 50°, or even steeper. As a practical matter, regardless of the size of the curd, the slope angle $\beta$ should be steep enough to insure a desired rapid rate of flow of the materials across the screen but shallow enough to insure a sufficient degree of retention of the curd on the screen to achieve desired drainage and removal of liquids. As noted, a practical range of slope for the screen has been found to fall within the range from about 30° to 50° with respect to the horizontal.

As respects the tilt angle $\alpha$ of the conveyance surfaces 42, the angle should be sufficient to effect a certain pitch or throw of smaller curd particles and fines to the next adjacent surface 42, so that these materials pass above the void spaces 52 with the liquids, and are not lost from the process. The angle should also be sufficient to insure that the larger particles are protected from abrasive impacts with the edges or sides of adjacent rod members 40, as they move down the screen. In general, it has been found that the conveyance angle $\alpha$ should be of the order of 5° to 20° with respect to the plane of the screen 32, will insure the desired results in the processing of cottage cheese and like soft delicate food particles. As a practical matter, an angle of about 15° has been found to be close to optimum for many processes.

The operation of the system of apparatus, as illustrated in FIGS. 1 through 6, can now be described as follows: A feed of intermixed liquid and soft particulate food material, such as cottage cheese curd and whey, is introduced to the system through the inlet conduit 31. The entering materials are directed by the upper portion 30 of the housing onto the surface of the separation screen 32. As particularly illustrated in FIG. 5, the soft curd particles are caused to move down the screen in a gentle, tumbling, cascading motion, by the generally downward pitch of the screen 32 coupled with the slight uptilt of the conveyance surfaces 42. Thus, the downward slope of the screen (represented by the slope angle $\beta$) insures that the particles will move rapidly downward across the surface of the screen whereas the slight uptilt of the segments (represented by the angle $\alpha$) effects a general pitch or throw of the curd particles so that they pass over the void spaces 52 to adjacent conveyance surfaces 42 below. Through control of the screen slope and rod uptilt angles, as herein described, rapid conveyance with maximum retention of the solid particles on the screen is obtained, consistent with virtually complete removal of liquids through the void spaces 52. Thus, as particularly illustrated in FIG. 5, the curd particles 50 move in gentle, rolling fashion from one conveyance surface 42 to the next, as the particles move down the screen. In like fashion, the relatively small curd particles or "fines," represented at 51, move off the uptilted conveyance surfaces 42 with sufficient pitch or throw to likewise pass over the void spaces 52 to the next conveyance surface, in much the same way as the larger curds, thus insuring a maximum retention of fines in the final product. In contrast, entrainment liquids such as wash water, whey or other processing liquid pass rapidly through the void spaces 52 into the discharge trough formed by the lower housing walls 24, 26, 28. As a practical matter, most of the liquid is removed adjacent an upper region of the screen, whereas any remaining liquid occluded upon the surface of the soft curd particles will collect on the conveyance surfaces 42, and pass through the void spaces 52 for removal at lower regions of the screen. Since the moving curd particles are spread in uniform fashion over the surface of the screen, a substantially complete removal of liquid and entrained moisture is accomplished during the travel of the solids to the bottom of the screen. The soft curd particles are simultaneously gently conveyed with no opportunity for abrasion or impact with sharp edges or surfaces, and with virtually no tendency to clump or compact in dense moisture retaining masses.

The description of the method and apparatus has so far related to use of a single tilted rod screen unit 20, supplying the processing vat 10. In this regard, it has been found that a single small screen unit 20 (viz., 11 inch by 30 inch) will accommodate the same throughput as larger perforated screen units, employed with spreading, raking and ditching operations in conventional fashion, in one-half to one-eighth the time, with greatly improved product uniformity and quality and virtually no loss of fines. Thus, in conventional processing involving draining of a vat in a batch operation, one to four hours will normally be required for filling the vat, draining the vat, and emptying the curd. In accordance with the present invention an equivalent result is obtained with the screening means 20 in one-half hour or less. However, despite the indicated significant reduction in processing times, it is possible to substantially improve upon such result by the simple expedient of using plural processing screens.

Referring to FIG. 7, an embodiment of an apparatus employing three of the tilted rod screening devices 20 is shown. Such an arrangement is easily accommodated with a cottage cheese processing tank of the type illustrated having a large upper opening 12. A further variation illustrated in FIG. 7 is the use of interior interior tubes generally represented at 54. These drain tubes, which may be in tubes, form of perforated columns, may be employed in washing operations in conjunction with washing operations carried out on the tilt rod screen unit 20. Thus, following introduction of drained washed curd to the tank 10, the tank may be drained of wash liquids through the columns 54 in conventional fashion. If desired, the separated liquid from the screen unit 20 may be recycled from the outlet 33 to the washing zone in tank 10 to effect separation of any remaining finely divided curd. Alternatively, the tank can be filled with water (effecting draining through the tubes 54), simultaneously with introduction of curds from the screening units 20 to effect a very rapid washing and dewatering. In such processing, the curd products are ultimately removed through the drain, represented at 56. Of course, while not illustrated, the screening units could be used in series arrangement (as well as in the parallel arrangement shown in FIG. 7) with introduction of wash liquid as the curds pass from the bottom of one screen to the top of the next screen.

By way of a generalized example, the apparatus disclosed in FIGS. 1 through 6 can be constructed and operated as follows: Assuming the washing of coagulated, freshly cut and cooked, small curd cottage cheese, the intermixed curds and wash water are introduced to the upper end of the tilted rod screening unit 20 so as to pass through the housing inlet section 30 onto the separating screen 32. A single separating screen is employed and is 11 inches wide and 30 inches long. The longitudinal spacing between the points of attachment of the transverse rod units 40 is three-sixteenth inch. The longitudinal dimension of the conveyance surfaces 42 is about one-eighth inch whereas the space between such units is about one-sixteenth inch. The slope angle $\beta$ of the screen is 40° and the tilt angle $\alpha$ of the rod units is 15°. The intermixed curds and wash water (average curd size about one-fourth inch) are introduced at a rate ranging from 100 to 125 gallons per minute. The tank 10 is of 5,000 pounds capacity and is filled to the level of about 3,500 pounds in a period of about 20 minutes. The drained product in the vat is immediately mixed with 1,500 pounds of creamed dressing containing salt and blended in a period of about 3 to 8 minutes. The resultant product is discharged through the bottom of the tank and packaged in conventional fashion.

Cottage cheese produced by the above processing is found to be generally composed of uniform, undamaged curd intermixed with a significantly higher proportion of retained fines than commercially available cottage cheese. The flow of the curd across the tilt rod screen unit 20 is exceptionally smooth and without evidence of abrasion, with the result that virtually no fines are separately produced as a result of the processing. The drainage through line 36 is comparatively free of residual fines and is highly satisfactory for disposal. Similar results are obtainable with other soft curd products such as curds used in cheddar cheese manufacture, soft foods such as macaroni, kidney beans, cherries and like fruit, which are required to be drained and washed prior to canning and like operations.

Many variations are possible in the processing and in the use of the apparatus herein disclosed. For example, in food processing, it is generally desirable to carry out the processing in a closed system. Thus, although not illustrated, the screening means 20 normally would be provided with a protective cover or hood extending over the surface of the separating screen 32. Also, as a further variation, it may be desirable to employ the apparatus of the present invention in conjunction with a washer cooler of the type disclosed in my copending application Ser. No. 126,079, filed Mar. 19, 1971. It is also contemplated that the lower end of the tilt rod screen might be bent or curved from the general planar configuration, the purpose being to achieve an initial fast dewatering in an inlet section, followed by a more prolonged dewatering operation in a discharge section. Many other variations will similarly occur to those in this art, in relation to specific products or foods. Accordingly, it should be understood that the disclosures herein are intended as purely illustrative and not in any sense limiting.

I claim:

1. In an improved method for rapidly and efficiently separating intermixed liquids and soft particulate foods, with minimum alteration in the characteristics of the separated components, the steps of providing an inclined separation zone in the form of a plurality of spaced apart transverse rods having substantially planar conveyance surfaces, arranging said conveyance surfaces in substantially coplanar relation wherein each individual conveyance surface is inclined at a slight angle with respect to a direction of conveyance across said separation zone, each of said conveyance surfaces being at a shallow obtuse angle with respect to said direction of conveyance so as to arrest the movement of materials flowing thereover, introducing a feed of intermixed liquid and soft particulate food to said separation zone along said direction of conveyance to thereby cause the soft food particles to move in gently cascading, arrested fashion along said conveyance surfaces and the liquid to pass through and between said conveyance surfaces, whereby the liquid and soft particulate food materials are rapidly and substantially separated, and independently collecting the separated liquid and soft food particles for further processing.

2. A method as in claim 1 wherein said separation zone is formed of a plurality of elongate transverse rods having conveying surfaces of relatively short dimension in the direction of conveyance.

3. A method as in claim 2 wherein the spacing between said rod conveyance surfaces in the direction of conveyance is less than said relatively short conveyance dimension.

4. A method as in claim 1 wherein said conveyance surfaces are arranged at an angle of the order of 5° to 20° with respect to said direction of conveyance.

5. A method as in claim 4 wherein said angle is 15°.

6. A method as in claim 1 wherein the plane of said plurality of substantially coplanar conveyance surfaces is at a slope of the order of 30° to 50° with respect to the horizontal.

7. A method as in claim 6 wherein said plane is at an angle of 40° with respect to the horizontal.

8. A method as in claim 1 wherein said feed of intermixed liquid and solid soft particulate food comprises intermixed cottage cheese curds and whey.

9. A method as in claim 8 wherein said feed also includes a substantial proportion of finely divided cottage cheese curds.

10. A method as in claim 1 wherein said feed of intermixed liquid and soft particulate food materials comprises cottage cheese curds and fines intermixed with wash water.

11. A method as in claim 1 wherein said separated liquid is recycled to a washing zone to effect separation of any remaining finely divided soft food particles.

12. A method as in claim 1 wherein said separated soft food particles are collected in the form of cottage cheese curds, intermixed with wash water and introduced to a washing zone to effect a subsequent separation of washed cottage cheese curds from the wash water.

13. In apparatus for rapidly and efficiently separating intermixed liquid and solid particulate foods, means forming an inclined tilted rod screen, said means including inclined screen supports, a plurality of rod means mounted transversely and in spaced relation on said supports to form a substantially coplanar rod screen, each of said rod means having a substantially planar conveyance surface tilted upward at an obtuse, relatively shallow angle as respects the plane of said screen, whereby each of said conveyance surfaces has a downward inclination that is slightly less than the downward inclination of the plane of said screen, inlet means adjacent an upper end of said screen and adapted to direct a feed of intermixed liquid and soft particulate food materials to said screen, collection means below said screen to receive liquid separated from said particulate food materials, and means to collect separated particulate food materials passing down and off the lower end of said screen.

14. Apparatus as in claim 13 wherein said inclined screen supports comprise a pair of spaced apart rods mounted at a substantial slope with respect to the horizontal.

15. Apparatus as in claim 14 wherein said support rods are mounted at an angle to provide said tilted rod screen with a slope of the order of 30° to 50° with respect to the horizontal.

16. Apparatus as in claim 13 wherein each rod means comprises an elongate bar of generally triangular configuration, the upper face of which constitutes said tilted substantially planar conveyance surface.

17. Apparatus as in claim 13 wherein the planar conveyance surface of each of said transverse rod means is tilted upward at an angle of between 5° and 20° with respect to the plane of said screen.

18. Apparatus as in claim 17 wherein said uptilt angle is 15°.

19. Apparatus as in claim 13 wherein said collection means below the screen comprises a substantially closed collection pan having a downward slope substantially greater than that of said tilted rod screen, whereby separated liquid is rapidly conveyed away from said screen.

20. Apparatus as in claim 13 wherein said means of collecting the separated particulate food material is a processing vessel for carrying out further processing related to said material.

* * * * *